April 15, 1930. G. B. BAKER 1,754,591
CITRUS FRUIT JUICE EXTRACTOR
Filed June 29, 1927
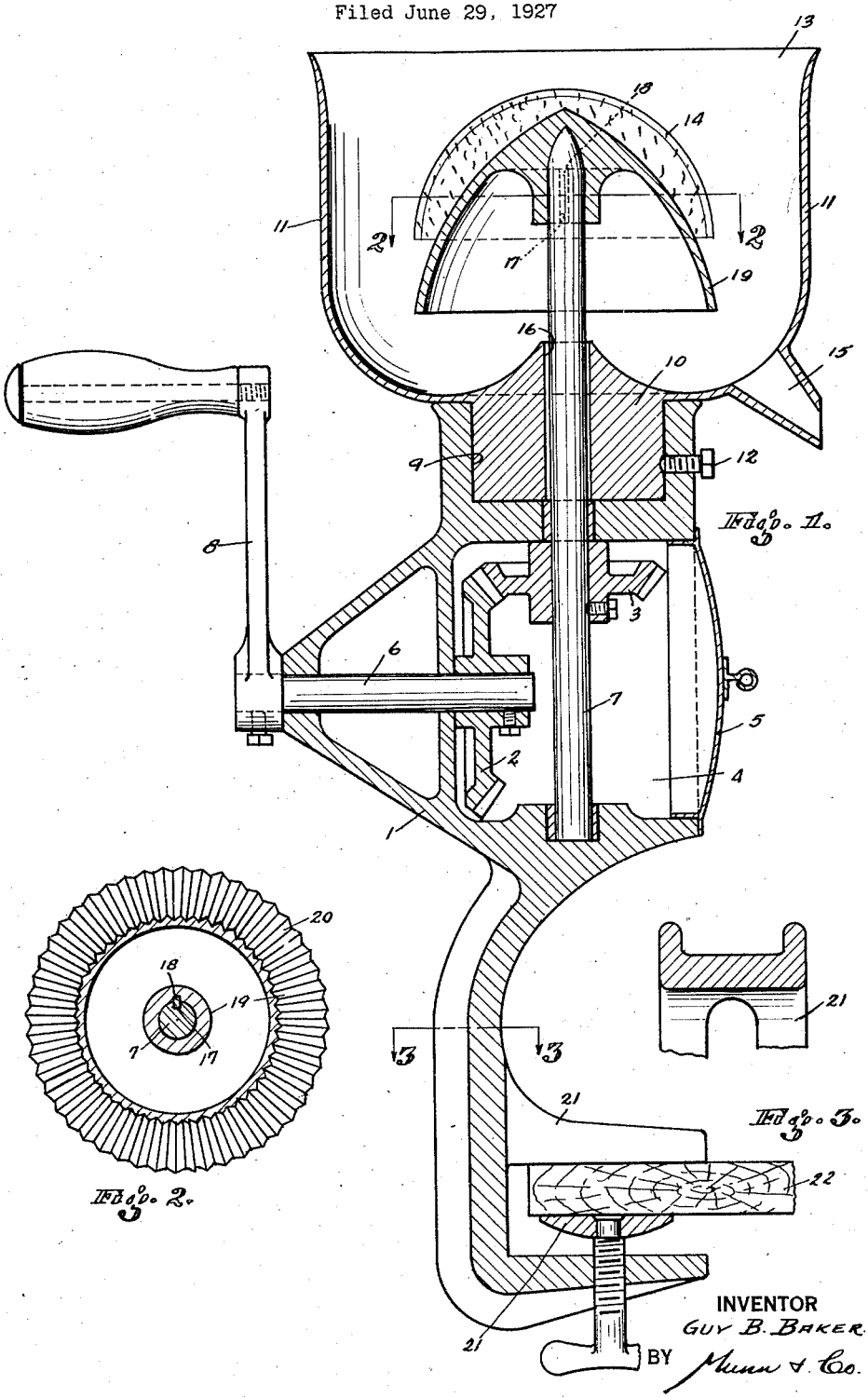
INVENTOR
GUY B. BAKER.
BY Munn & Co.
ATTORNEYS.

Patented Apr. 15, 1930

1,754,591

UNITED STATES PATENT OFFICE

GUY B. BAKER, OF RED BLUFF, CALIFORNIA

CITRUS-FRUIT-JUICE EXTRACTOR

Application filed June 29, 1927. Serial No. 202,322.

My invention relates to improvements in citrus fruit juice extractors, and it consists in the combinations, constructions and arrangements hereinafter described and claimed.

An object of my invention is to provide a citrus fruit juice extractor which is manually operated, extremely simple in construction and in which the parts are so assembled that they may be removed for cleaning and for oiling.

Other objects and advantages will appear in the following specification, and the novel features of my invention will be particularly pointed out in the appended claims.

My invention is illustrated in the accompanying drawing, forming a part of this application, in which Figure 1 is a vertical section through the device;

Figure 2 is a section along the line 2—2 of Figure 1; and

Figure 3 is a section along the line 3—3 of Figure 1.

In carrying out my invention I provide a casing 1, which houses beveled gears 2 and 3 in a compartment 4. A cover 5 closes the compartment, but may be removed when it is desired to oil the gears. The beveled gears are concealed in the recess, so as to prevent accidents.

The gear 2 is mounted upon a drive shaft 6, while the gear 3 is mounted upon a driven shaft 7. The shaft 6 is mounted in two bearings.

A crank 8 operates the drive shaft, as clearly shown in Figure 1.

At the top of the casing 1 is provided a recess 9, in which a projection 10, forming a part of the cup 11, is removably disposed. A set screw 12 secures the cup to the casing. It will be noted that the cup has an open top 13 for permitting fruit 14 to be inserted into the cup, and that the cup has an outlet drain 15 through which the juice is passed.

A shaft 7 extends through a bore 16 in the projection 10, and has a grooved portion 17 for receiving a key 18, the key securing a squeezer 19 to the shaft. Figure 2 shows how the outer surface of the squeezer 19 is corrugated at 20, which is the usual construction.

The casing is supported by a clamp 21 of standard construction, which is adapted to support the casing in vertical position with respect to a supporting board 22.

From the foregoing description of the various parts of the device, the operation thereof may be readily understood.

The device is secured to a table top, or other like support, and the fruit is placed upon the squeezing member 19, and is forcibly held in contact with the member while the crank 8 is actuated. The member 19 is rotated with respect to the fruit and causes the juice to be forced from the fruit, and to flow out through the opening 15.

When it is desired to clean the device, it is merely necessary to pull the member 19 upwardly from the shaft 7 and then loosen the set screw 12, whereby the cup 11 is free to be removed. In case it is necessary to lubricate the gears, the cover 5 may be temporarily removed. The device is extremely compact in construction and is durable and efficient for the purpose intended.

Although I have shown and described one embodiment of my invention, it is to be understood that the same is susceptible of various changes and I reserve the right to employ such changes as may come within the scope of the appended claims.

I claim:

1. A citrus fruit juice extractor comprising a frame having two recesses therein, a shaft extending through both recesses and being rotatably carried by said frame, a second shaft extending into the lower recess, a crank handle secured to the second shaft, gears secured to both shafts and meshing with each other, said gears being disposed in the lower recess, a cover for closing the lower recess, a cup having a projection receivable in the upper recess and having an outlet drain disposed at its bottom, and a juice-extracting member mounted on said first shaft and being disposed within the cup, said member being nonperforate.

2. A citrus fruit juice extractor comprising a body member cast in a single piece and having a gear-receiving recess therein and a clamp forming a part of the casting, a cover removably closing the recess, a cup removably secured to said casting and having an outlet in its bottom. a juice extracting member rotatably disposed in said cup, a handle, and means including gears operatively connecting the handle with said member, said gears being disposed within said recess.

GUY B. BAKER.